Oct. 30, 1962 C. L. CLAFF ETAL 3,060,934
MEMBRANE-TYPE OXYGENATOR
Filed March 24, 1960 3 Sheets-Sheet 1

INVENTORS
CLARENCE LLOYD CLAFF
ARMAND A. CRESCENZI
PETER C. HOFSTRA
BY Kenway, Jenney, Witter
& Hildreth

ATTORNEYS

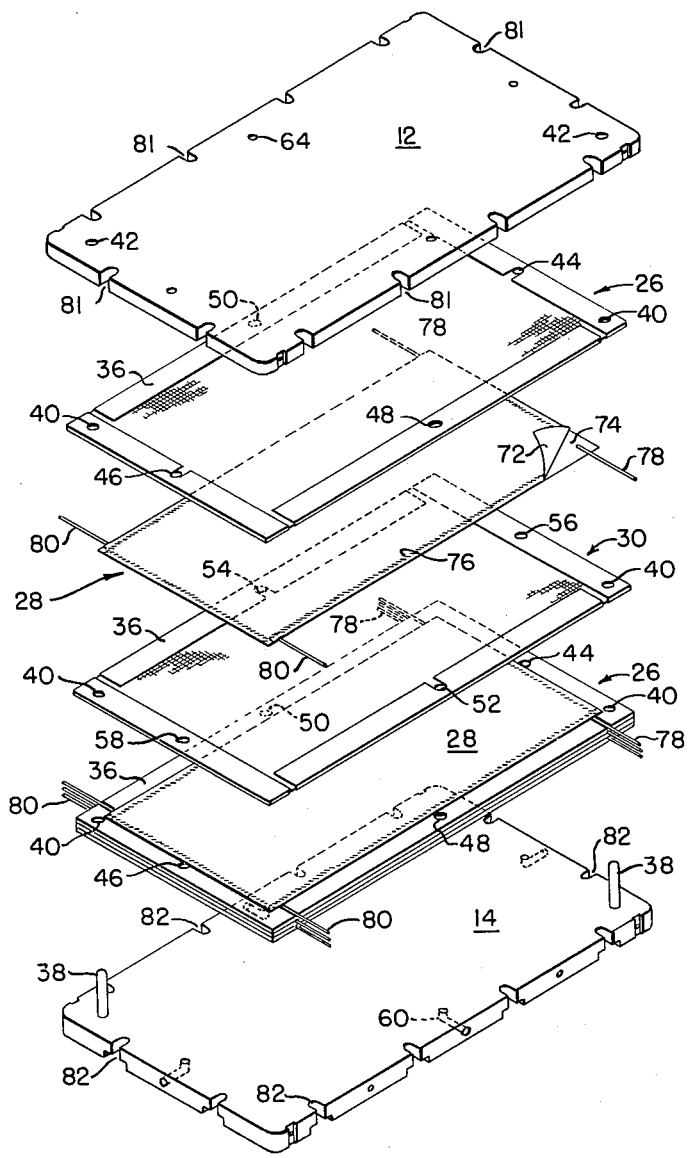

Oct. 30, 1962   C. L. CLAFF ETAL   3,060,934
MEMBRANE-TYPE OXYGENATOR
Filed March 24, 1960   3 Sheets-Sheet 3

INVENTORS
CLARENCE LLOYD CLAFF
ARMAND C. CRESCENZI
PETER C. HOFSTRA
BY Kenway, Jenney, Witter & Hildreth
ATTORNEYS

United States Patent Office 3,060,934
Patented Oct. 30, 1962

3,060,934
MEMBRANE-TYPE OXYGENATOR
Clarence Lloyd Claff, 5 Van Beal Road, Randolph, Mass.; Armand Angelo Crescenzi, Stillman Lane, Pleasantville, N.Y.; and Peter C. Hofstra, 147 Haldane Ave., Paterson, N.J.
Filed Mar. 24, 1960, Ser. No. 17,319
10 Claims. (Cl. 128—214)

This invention is concerned with apparatus for maintaining complete cardo-respiratory functions during cardiac by-pass and, more particularly, with an extracorporeal blood oxygenator for use in total body perfusion. In earlier attempts to provide a blood oxygenator, attempts were made to adapt the apparatus originally used in hemo dialysis for use as a blood oxygenator. Subsequently, what will be referred to as a flat press membrane type oxygenator was developed. This flat press type membrane type oxygenator comprised a relatively hard rubber mat with one surface of the mat being provided with parallel grooves extending transversely of the mat and spaced apart longitudinally of the mat. On this grooved mat was laid two separate sheets of a membrane-like material which was pervious to oxygen and carbon dioxide but impervious to blood. On top of the two separate layers of membrane was laid a double layer of plastic mesh. A plurality of such sets of a rubber grooved mat, separate layers of membrane material, and double layers of plastic mesh were stacked one on the other, the number of such sets being determined by a desired rate of blood flow through the oxygenator. The sets of components heretofore described were clamped between plates to firmly engage each set of membrane layers between the grooved rubber mat on one side and the plastic mesh on the other side thereof. The stacked sets of components were sealed around their periphery and manifold means were provided for the passage of blood between the membranes in each pair or set thereof and for the passage of oxygen through the grooves in the rubber mat.

This invention is primarily concerned with the improvement of membrane type oxygenators and has as an object thereof the provision of an improved membrane type oxygenator which will present a closer resemblance to the functional components of a lung. An additional object of the present invention is to provide a membrane type oxygenator having a more efficient exchange of gases per unit of membrane surface area. A further object is to provide an improved membrane type oxygenator having a reduced perfusion resistance internally of the oxygenator. Further objects of the invention include a reduction in the amount of blood required for priming the oxygenator, an over-all simplification of the oxygenator, and the provision of an oxygenator in which the primary components thereof which are in contact with blood and oxygen are completely disposable.

Briefly, a membrane type blood oxygenator constructed in accordance with this invention comprises a plurality of sealed membrane bags or envelopes fabricated of a thin gas pervious and blood impervious plastic material and a plurality of woven plastic spacers having an open weave and having a thickness substantially greater than twice the thickness of the threads forming the weave so that oxygen may be passed through each spacer in any direction. The membrane bags and spacers are stacked one on the other with a spacer being disposed at the top and bottom of the stack. A stack of membrane bags and spacers are clamped between a pair of plates to firmly engage each membrane bag between a pair of spacers on opposite sides thereof with sufficient force that each membrane bag is transformed into a capillary bed or interlaced capillary passages whereby when blood is introduced into one end of a bag, the blood will flow through the bag to the other end thereof along a plurality of capillary paths. In use, oxygen is introduced into each of the spacers with oxygen flow between the inlets and outlets of the spacers being generally in a direction opposite that of blood flow or at least angularly of the blood flow. A full understanding of the present invention and of an oxygenator embodying the invention as well as a better understanding of the manner in which the objects and advantages of the invention are achieved may be had by reference to the following detailed description when taken in connection with the accompanying drawings in which:

FIG. 2 is an exploded perspective view of the membrane bags and spacers of the oxygenator of FIG. 1;

Figure 1:
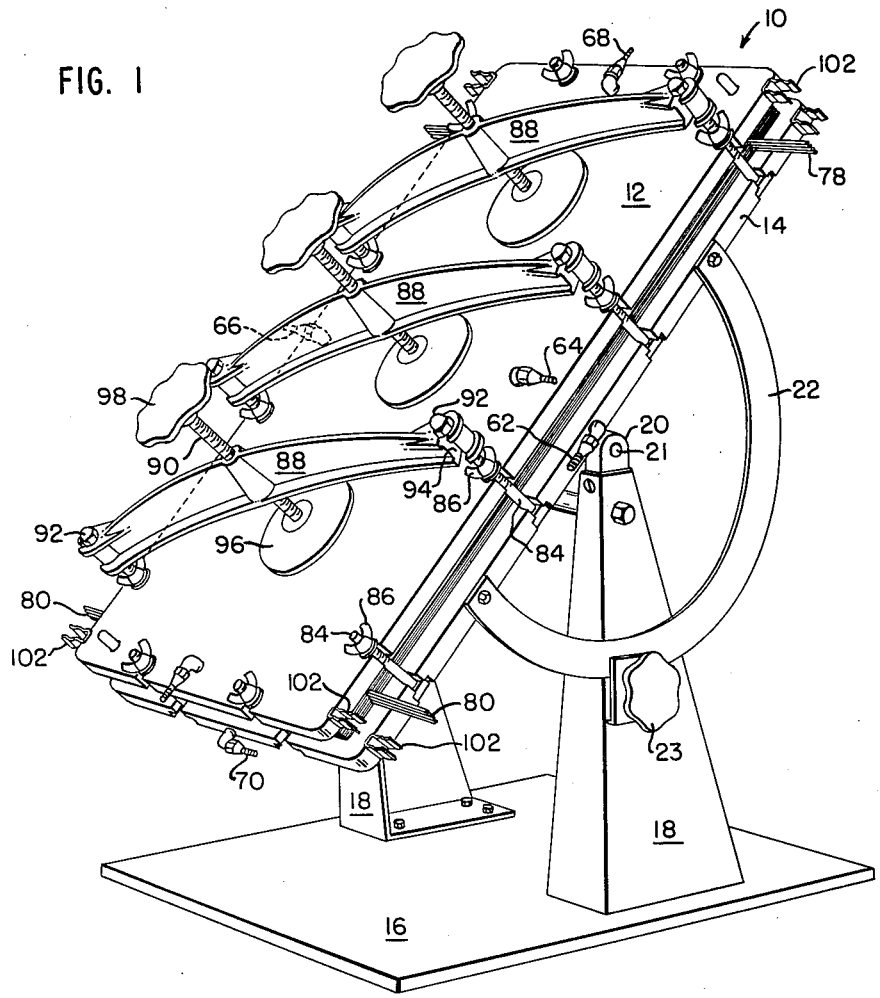
FIG. 1 is a perspective view of a flat press membrane type oxygenator constructed in accordance with the present invention.

Referring to the drawings and particularly FIG. 1, a flat press type membrane oxygenator embodying the present invention is shown generally at 10 and comprises rectangular, rigid top and bottom plates 12 and 14. The oxygenator is supported on a base 16 by a pair of vertically extending support members or pedestals 18 each having a trunnion 20 at its upper end. A shaft 21 mounted on and extending laterally of the bottom plate 14 is supported by the trunnion 20 to provide for tilting movement of the oxygenator about a lateral axis of the bottom plate. A sector 22 is mounted on the bottom plate 14 with the geometric center of the sector being coincident with the axis of the shaft 21. The sector 22 depends from the bottom plate and is engageable by manually operable clamping means 23 on the pedestal 18 to hold the oxygenator in any desired tilted position about the axis of the shaft 21. While only one sector 22 and clamping means 23 is shown in FIG. 1, it will be understood that a similar arrangement could be provided on the other side of the bottom plate 14 in association with the other pedestal 18.

Figure 3:
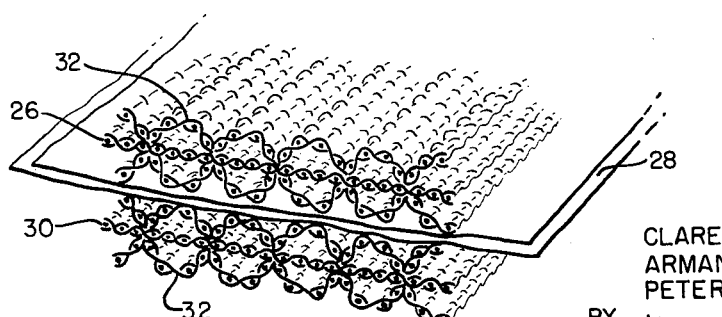
FIG. 3 is an enlarged perspective view of a membrane bag and a pair of exemplary spacers in stacked relation.

With particular reference to FIGS. 1 to 4, a vertical stack of oxygen bed forming spacers and membrane bags are disposed between the top and bottom plates 12 and 14. As most clearly shown in FIG. 2, a spacer 26 is disposed immediately below the top plate 12 and is in overlying engagement with a membrane bag 28 which in turn is in overlying engagement with a spacer 30. This alternate arrangement of a spacer 26, a bag 28, and a spacer 30 is repeated a predetermined number of times consistent with the desired oxygenator capacity. As will be hereinafter apparent, the stack of spacers and membrane bags begins with and ends with a spacer. It is the twofold purpose of the spacers to provide an oxygen bed through which oxygen may be flowed across the next adjacent surface of a next adjacent membrane bag and to cooperate with the next adjacent spacer on the opposite side of a next adjacent membrane bag to impress upon the membrane bag an interlaced pattern of thin barriers which will form an interlaced pattern of capillary flow paths in the membrane bag, thus transforming each membrane bag into a capillary bed. With particular reference to FIG. 3, there is shown an exemplary construction of the woven spacers 26 and 30. Each of the spacers is fabricated by weaving plastic threads to provide an open weave mat which has parallel convolutions or spaced apart ribs 32 extending longitudinally of the mat on both the top and bottom sides thereof. The resulting mat will thus have a thickness which is substantially greater than twice the thickness of the threads forming the mat; and by providing an open weave, the mat will be pervious to gas flow in all directions through the mat. It is preferred that the mat be resilient with respect to compression of the mat by forces applied at right angles to the general plane of the mat such as when the mats are clamped between the top and bottom plates 12 and 14. When a pair of such mats are clamped on opposite sides of a membrane bag 28, the open weave or pattern of the mats will be impressed upon the bag to provide a bed of random direction, interlaced, capillary passages.

A specific example of a mat constructed in accordance with this invention had an effective surface area of 11 x 22 inches and an over-all size of 14 x 26 inches. The mat was woven with threads of Saran interwoven with threads of polyethylene with the thread size being approximately .008 inch. Twelve ribs or convolutions were provided per inch of the mat and with a depth of groove of approximately $\frac{1}{32}$ of an inch. The thickness of the mat under a compressive force of one p.s.i. was approximately .08 inch and the mat provided approximately 10.9 percent compression under a 5 p.s.i. loading. This exemplary mat had an air permeability of approximately 730 cubic feet of air per square foot of mat per minute and had an air flow resistance of .70 inch of water. It will, of course, be understood that the specific geometric configuration of the mat may be widely varied while still providing means for forming a capillary bed from a membrane bag disposed between two such spacers and providing an oxygen bed permitting oxygen flow in all directions therethrough. Accordingly, a spacer or mat of a type suitable for use in the present invention and for the purposes herein described will hereinafter be generically referred to as a "three-dimensionally gas pervious, woven, plastic" mat or spacer.

Each of the mats 26 and 28 is provided with a resilient peripheral border 36 which may be provided by dipping the edges of the mats into a rubberized compound to provide a resilient and tacky border for the mats. This border will, when the mats and bags are stacked as shown in FIGS. 1 and 2, provide an edge seal around the oxygenator precluding escape of oxygen from within the mats. In order to assist in locating the mats in proper registry with each other during stacking thereof, the bottom plate 14 is provided with a pair of vertically extending locating dowels or pins 38 which, as most clearly shown in FIG. 2, are adapted to be received in locating apertures 40 at diagonally opposite corners of the mats. Also, the top plate 12 is provided with locating apertures 42 at diagonally opposite corners thereof for reception of the locating pins 38. The border seal 36 of each of the mats 26 is provided with a pair of apertures 44, 46 disposed at the opposite ends respectively of the mat. The border seal between the apertures 44 and 46 and the effective mat area surrounded by the border seal 36 is removed to provide for communication between the apertures 44 and 46 and the interior of the mat. Each mat 26 is also provided on its border seal with a pair of apertures 48 and 50, which apertures are not in communication with but rather are sealed from the interior of the mat. The mats 30 are provided with apertures 52 and 54, respectively alignable with the apertures 48 and 50 of the mats 26. The apertures 52, 54 are in the bordering seal portion of the mats 30 and communicate with the interior of the mats 30. Also, the border seal portions of the mats 30 are provided with a pair of apertures 56 and 58 which are sealed from the interior of the mat and are respectively alignable with the apertures 44 and 46 of the mat 26.

As will be apparent, when the mats and bags are assembled in stacked relation, the apertures 44 and 56 will provide an internal manifold extending vertically through the stack but communicating only with the interior of the mats 26 at one end of the mats. The aligned apertures 46 and 58 will likewise provide a similar manifold at the other end of the mat. Correspondingly, the apertures 48 and 52 provide an internal manifold at one longitudinal side edge of the mats, which manifold communicates only with the mats 30. The apertures 50 and 54 will, of course, provide a similar manifold on the other side of the mats. As shown in FIGS. 1 and 2, the bottom plate 14 is provided adjacent one longitudinal edge thereof with an internal passage 60 communicating at one end with the lower end of the manifold formed by the apertures 48 and 52 communicating at the other end with a fitting 62 adapted to be connected to a source of oxygen. The top plate 12 is provided with an aperture 64 communicating with the upper end of the manifold provided by the apertures 48 and 52 and connected to a fitting 66 which also is adapted to be connected to a source of oxygen. Similar apertures and internal passages are provided adjacent the other side edge of the bottom and top plates and similar fittings 66 are provided for connection of the manifold on this side of the mats to an oxygen exhaust line. In a similar manner the opposite ends of the manifold provided by the apertures 44 and 56 are connected by suitable fittings 68 for connection of the manifold to an oxygen exhaust line. The other end of the stacked assembly is provided with fittings 70 communicating with the opposite ends of the manifold at this end of the pack for the introduction of oxygen into the mats 26.

Figure 4:
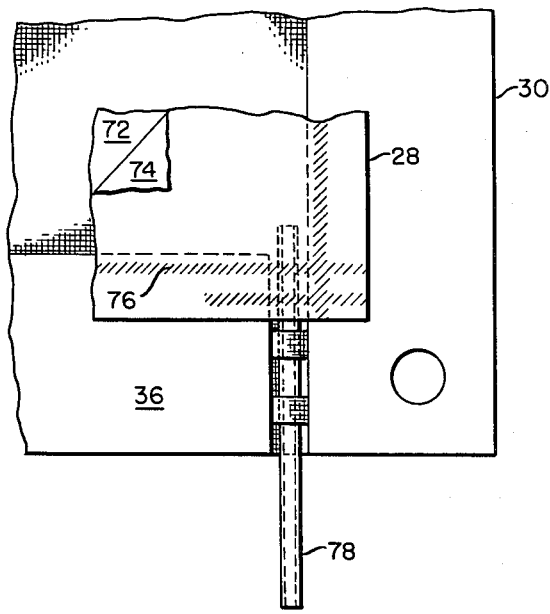
FIG. 4 is an enlarged fragmentary plan view of a membrane bag arranged over an exemplary spacer.

With particular reference to FIGS. 2 and 4, each of the membrane bags 28 comprises two sheets 72 and 74 of gas pervious, blood impervious, thin, plastic material. The two layers of materials are suitably sealed, such as by a heat seal 76 extending circumferentially about the bag and closely adjacent the peripheral edges thereof. Each of the bags is provided at one end with a pair of blood outlet tubes 78, one end of each of which is sealed within the bag and the other end of which extends outwardly from a longitudinal side edge of the bag. Each bag is further provided with similarly arranged blood inlet tubes 80 at the other end of the bag.

The material from which a suitable membrane bag is fabricated must have certain characteristics. It must be chemically and biologically inert. It must not have a sticky or adhesive quality, particularly with respect to adherence to itself. It is preferred that the material have a low fluid friction coefficient to facilitate gravity flow of blood through the bag. It must have a high permeability for oxygen and carbon dioxide, and it preferably must be extremely thin while at the same time providing a minimum of leakage. It should have a relatively high mechanical durability including good resiliency and recovery following deformation. Particularly, it must have good structural integrity over prolonged periods of diffusion. Further, it is, of course, important that the material contain no abstractable additives which could contaminate the blood passing through the bag, and, of course, the bag must be suitable for good sealing at its edge portions. Also, the membrane material should be non-wettable so that it will not absorb blood constitutents; it should provide a relatively constant rate of diffusion; it should be free of low moleculary processing aids; and it should maintain a steady water balance with absence of pH alterations related to the "associated water activity" of wettable films. The term "membrane material" will be used hereinafter in the specification and claims to define a material having the above characteristics. A specific example of a membrane material, or in other words a material meeting the above criteria, is tetrafluoroethylene polymer, which is commercially known under the trade mark Teflon. A specific example of a membrane bag constructed and used in accordance with the invention comprised two layers of cast Teflon each ¼ mil thick and heat sealed about their peripheral edge portions.

In use, the spacers and bags are alternately arranged in stacked relation between the top and bottom plates 12 and 14 as shown in FIG. 2. The top and bottom plates are each provided with a plurality of notches 81 and 82, respectively. With the top plate assembled on the locating pin 38 of the bottom plate, the notches in the plates will be in alignment and adapted to receive bolts 84 each having a squared head received in an appropriately shaped enlargement of the slots 82 of the bottom plate. A wing nut 86 on each of the bolts 84 serves to retain the plates and spacers and bags in stacked assembly. Certain of the bolts 84 on each longitudinal edge of the stacked assembly are of a length which is sufficient to provide that the bolts extend a substantial distance beyond the wing nuts when the wing nuts are in tightened position. A plurality of arched clamping frames 88 extend between bolts on opposite sides of the assembly, and each of the clamping frames carries a jack screw 90. More specifically, each of the clamping frames 88 comprises an arched cast member having sleevelike portions at its opposite ends in which are receivable the bolt portions extending above the wing nuts 86. The frames 88 are prevented from rising off the bolts 84 by nuts 92 on the ends of the bolts. It will thus be apparent that the same clamping bolts 84 may be used with the oxygenator even though the number of membrane bags and spacers is varied for different bodies. In order to facilitate installation of the frames, the sleeve-like portion at one end of the frame is provided with a slot 94 communicating with the bore at this end of the frame and extending generally laterally outwardly of the frame. The sleeve-like portion at the other end of each frame is provided with a similar slot but with a slot extending generally longitudinally of the frame. Each frame is provided with a central generally laterally extending boss in which the jack screw 90 is threadably received so as to extend laterally of the frame and at right angles to the general plane of the stacked oxygenator assembly. On the lower end of each jack screw is mounted a pressure plate or disk 96 which bears upon the top plate 12. A manually rotatable knob 98 is provided at the outer end of each jack screw whereby the jack screws may be manually rotated. When the oxygenator is assembled, the wing nuts 86 and jack screws 90 are adjusted to provide compression or clamping of the stacked assembly of spacers and membrane bags which is sufficient to form the capillary beds heretofore described. In a specific embodiment of an oxygenator constructed in accordance with the invention and utilizing membrane bags and spacers such as described in the specific examples above, the wing nuts 86 and jack screws 90 need merely to be turned inward until they are finger tight in order to provide a clamping force on the edges and center points of the assembly sufficient to provide the capillary beds.

Figure 5:
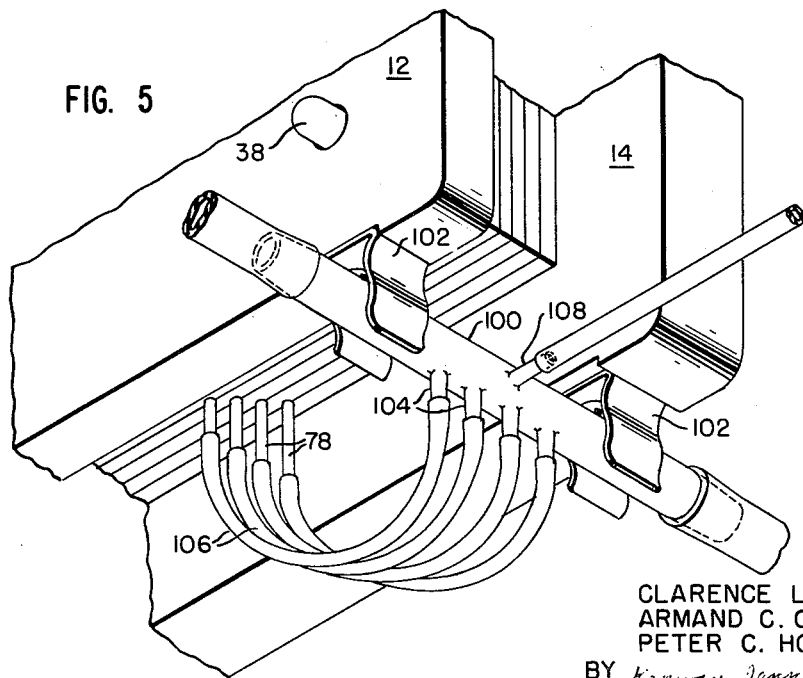
FIG. 5 is a fragmentary enlarged perspective view of a portion of the oxygenator of FIG. 1 illustrating an external manifolding of the membrane bags.

It is preferred that blood be introduced into the membrane bags through the tubes 80 which are at the lower end of the assembly in FIG. 1 when the assembly is in tilted position as shown in the drawing. The tilting of the oxygenator and introduction of blood into the lower end thereof during the priming of the unit is preferred in order to insure that all air and other gases will be purged from the unit prior to use. The connection of the tubes 80 on the opposite edges of the longitudinal edges of the membrane bags to a source of blood may be provided by any suitable manifold means. However, in the specific embodiment of FIGS. 1 and 5 this manifolding is provided by a tubular member 100 held in spring clips 102 on the top and bottom plates 12 and 14, respectively. The tube is provided with a plurality of radially outwardly extending tubular portions 104 spaced apart longitudinally of the tube. The tubular side extensions 104 are connected spectively to the membrane inlet tubes 80 by connecting tubes 106. The manifold tube 100 is provided with another laterally extending tubular portion 108 extending at generally right angles to the lateral projections 104 for connection of the manifold to a secondary source of blood such as might be used for transfusion. The opposite ends of the manifold 100 are open and are suitably connected to the source of blood. The membrane bag outlet tubes 78 at the opposite end of the bag may be manifolded in this manner similar to that shown in connection with the inlet tubes 80. When it is desired to begin the oxygenation process, a source of oxygen is connected to the fitting 68 at the same end of the assembly as the blood outlet tube 78 in order to provide for a counterflow of oxygen through the spacers or mats 26. Also, a source of oxygen is connected to the fittings 62 and 64 to provide for a flow of oxygen through the mats 30 in a direction generally laterally of the direction of blood movement or at least at a substantial angle thereto. During the oxygenating process, the oxygenator may be tilted in a direction opposite that shown in FIG. 1 in order that gravity may assist in pumping blood through the oxygenator, or, if desired, the oxygenator may be placed in a lateral position as conditions may demand. Blood flow through the oxygenator may be provided by intermittent or pulsating pumping of the blood to a collecting reservoir with a second pump being used to return the blood from the reservoir to a body. The intermittent or pulsating pumping permits the resiliency of the spacers to minimize the trapping of blood in the capillary beds. The separate pump for pumping blood through the oxygenator is preferably operated at pressures within the physiological range but directly proportional to the length and type of pattern impressed on the membrane bags. With an oxygenator constructed in accordance with this invention, oxygen saturation of up to 95 percent has been obtained repeatedly with satisfactory arteriovenous differences and with a lack of retention of carbon dioxide. Blood flow rates of 100 to 125 cc. per membrane envelope per minute with pressures within the physiological range have been provided.

Thus, it can be seen that there has been provided an improved flat press type membrane oxygenator which presents a closer resemblance to the functional components of a lung and which will provide a more efficient exchange of gases per unit of membrane surface area. The three-dimensionally gas pervious spacers forming the oxygen beds and cooperating to impress the membrane bags to provide the capillary bed also provide a reduced gas flow resistance internally of the oxygenator and are suitable for furnishing as disposable units, as, of course, are the membrane bags. Further, the oxygenator, as will be apparent, is easily assembled and disassembled and may be easily transported from one location to another.

Inasmuch as many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language in the following claims is intended to cover all of the general and specific features of the invention herein described and all statements of the scope of the invention which, as a matter of language, might be said to fall therebetween.

We claim as our invention:

1. In a membrane type blood oxygenator, a plurality of three dimensionally gas pervious woven plastic spacers and sealed envelopes of membrane material alternately arranged in overlying resiliently compressive engagement, each of said spacers being fabricated from threads woven into a three dimensionally open weave so as to be resiliently compressible in its thickness dimension, the threads on the spacer surface next adjacent each envelope being in a pattern which in cooperation with the threads of the oppositely facing surface of the spacer on the opposite side of the envelope impresses a pattern of interlaced capillary flow paths on the envelope to transform the envelope into a bed of capillary passages, each envelope being provided with blood inlet means at one end and blood outlet means at the other end thereof, means for introducing oxygen into said spacers at points spaced from said one end of the envelopes, and oxygen exhaust means for the spacers located generally opposite the means for introducing oxygen.

2. A membrane type blood oxygenator as described in claim 1 in which each of said spacer members is provided with a resilient seal portion extending about its periphery and on both sides of the spacer.

3. A membrane type blood oxygenator as described in claim 2 in which each of said spacer members is provided with a pair of apertures extending through said seal portion, said apertures being disposed adjacent opposite edges respectively of the spacer and being in communication with the interior of the spacer.

4. A membrane type blood oxygenator as defined in claim 2 in which said plurality of spacers comprises a first set of spacers and a second set of spacers respectively alternately arranged in stacked relation with the spacers of the first set, each of the spacers in each set thereof being provided with a first pair of apertures extending through the seal portion at opposite edges respectively of the spacer and communicating with the interior of the spacer, each of the spacers in each set thereof further being provided with a second pair of apertures extending through the seal portion at the other opposite edges respectively of the spacer, said second pair of apertures being sealed from the interior of the spacer, the first and second pair of apertures in said first set of spacers being respectively aligned with the second and first pair of apertures in said second set of spacers.

5. A membrane oxygenator as described in claim 2 in which said membrane envelopes and spacers are generally rectangular and arranged in vertically stacked relation, a pair of plates clampingly engaging the stack of spacers and envelopes therebetween, and means supporting the plates and said stack of spacers and envelopes and mounting the same for selectively adjustable tilting movement.

6. In a membrane type blood oxygenator, a plurality of three-dimensionally gas pervious woven plastic spacers, a plurality of sealed membrane envelopes each fabricated from a pair of overlying layers of thin tetrafluoroethylene polymer sealed together along their peripheral edges, tubular blood inlet means extending from each envelope adjacent one end thereof, tubular blood outlet means extending from each envelope at the other end thereof, the spacers and envelopes being arranged alternately with said spacers and in overlying resiliently compressive engagement with spacers on opposite sides of each envelope, each of said spacers being fabricated from threads woven into a three dimensionally open weave so as to be resiliently compressible in its thickness dimension, the threads on the spacer surface next adjacent each envelope being in a pattern which in cooperation with the threads on the oppositely facing surface of the spacer on the opposite side of the envelope impresses a pattern of interlaced capillary flow paths on the envelope and restrict blood flow through the envelope to a plurality of capillary passages, means for introducing oxygen into each of the spacers, and oxygen exhaust means for the spacers.

7. A membrane type oxygenator as defined in claim 6 in which each of said spacers is provided with a resilient seal portion extending about its periphery and engaged with the seal portions of next adjacent spacers and with the peripheral edge portions of next adjacent envelopes.

8. A membrane type oxygenator as defined in claim 6 in which each of said spacer members is provided with a pair of apertures extending through said seal portion, said apertures being disposed adjacent opposite edges respectively of the spacer and being in communication with the interior of said spacer, the apertures in each spacer being aligned with the apertures in the next adjacent spacers, and means for connecting the aligned apertures to a source of oxygen and to oxygen exhaust means respectively.

9. A membrane oxygenator as defined in claim 6 in which said plurality of spacers comprises a first set of spacers and a second set of spacers respectively alternately arranged in overlying relation with the first set, each of the spacers in each set thereof being provided with a first pair of apertures extending through the seal portion at opposite edges respectively of the spacer and communicating with the interior of the spacer, each of the spacers in each set thereof further being provided with a second pair of apertures extending through the seal portion at the opposite edges respectively of the spacer, said second pair of apertures being sealed from the interior of the spacer, the first and second pair of apertures in said first set of spacers being respectively aligned with the second and first pair of apertures in said second set of spacers to provide a first pair of internal oxygen inlet manifolds and a second pair of internal oxygen exhaust manifolds, means to connect the first pair of manifolds to an oxygen source, means to connect the second pair of manifolds to oxygen exhaust means, said envelopes and spacers being generally rectangular and being arranged in vertically stacked relation, a pair of plates clampingly engaging the stack of spacers and envelopes therebetween, and means supporting the plates and said stack of spacers and envelopes and mounting the same for selectively adjustable tilting movement.

10. A flat press type membrane oxygenator comprising a plurality of generally rectangular spacers fabricated of three dimensionally gas pervious woven plastic material, a plurality of generally rectangular sealed envelopes of membrane material, the spacers and envelopes being arranged alternately in vertically stacked relation, blood inlet means at one end of each envelope, blood outlet means at the other end of each envelope, means for introducing and exhausting oxygen into and from the interior of each spacer, means on the top and bottom of the stack of spacers and envelopes clamping the same, each of said spacers being fabricated from threads woven into a three dimensionally open weave so as to be resiliently compressible in its thickness dimension, the threads on the spacer surface next adjacent each envelope being in a pattern which in cooperation with the threads on the oppositely facing surface of the spacer on the opposite side of the envelope impresses a pattern of interlaced capillary flow paths on the envelope and to restrict blood flow through the envelope to a series of capillary passages, means mounting the stacked envelopes and spacers for tilting movement about a transverse axis, and means for holding the stack in selected adjusted positions about said transverse axis.

References Cited in the file of this patent

UNITED STATES PATENTS

| 2,686,154 | MacNeill | Aug. 10, 1954 |
| 2,756,206 | Gobel | July 24, 1956 |
| 2,881,124 | Tye | Apr. 7, 1959 |
| 2,891,900 | Kollsman | June 23, 1959 |

OTHER REFERENCES

Anthonisen et al.: "Clinical Experience With the Skeggs-Leonards Type of Artificial Kidney," from the Lancet, volume II, No. 25, December 1956 (page 1277). (Copy in Division 55.)

Kolff et al.: "Disposable Membrane Oxygenator (Heart Lung Machine) and Its Use in Experimental Surgery," from the Cleveland Clinic Quarterly, volume 23, No. 2, April 1956 (pages 69–79). (Copy may be obtained from the National Library of Medicine.)